United States Patent [19]

Ruell

[11] 4,427,881
[45] Jan. 24, 1984

[54] SENSOR DEVICE FOR MEASURING A PHYSICAL PARAMETER

[75] Inventor: Hartwig Ruell, Fürstenfeldbruck, Fed. Rep. of Germany

[73] Assignee: Siemens Corporation, Iselin, N.J.

[21] Appl. No.: 241,632

[22] Filed: Mar. 9, 1981

[51] Int. Cl.³ .............................................. G01D 5/30
[52] U.S. Cl. .............................. 250/227; 250/231 R; 350/96.33; 374/205
[58] Field of Search ............... 356/43, 44; 374/205; 250/231 R, 231 P, 227; 350/96.2, 96.18

[56] References Cited

U.S. PATENT DOCUMENTS

| | | | |
|---|---|---|---|
| 3,305,691 | 2/1967 | Hock | 250/231 R |
| 3,415,712 | 12/1968 | Barker, Jr. | 374/205 |
| 3,650,187 | 3/1972 | Judin | 350/96.2 |
| 4,087,684 | 5/1978 | Mott | 250/231 R |
| 4,204,742 | 5/1980 | Johnson et al. | 350/96.2 |
| 4,239,963 | 12/1980 | August et al. | 250/231 R |
| 4,303,302 | 12/1981 | Ramsey et al. | 350/96.2 |
| 4,304,630 | 12/1981 | Tanner | 250/227 |
| 4,359,637 | 11/1982 | Perren | 250/231 R |

FOREIGN PATENT DOCUMENTS

| | | |
|---|---|---|
| 27540 | 4/1981 | European Pat. Off. |
| 1189755 | 3/1965 | Fed. Rep. of Germany |
| 1936346 | 7/1970 | Fed. Rep. of Germany |
| 2114107 | 11/1971 | Fed. Rep. of Germany |
| 2333663 | 1/1975 | Fed. Rep. of Germany |
| 2454669 | 5/1976 | Fed. Rep. of Germany |
| 2833669 | 2/1979 | Fed. Rep. of Germany |
| 2849186 | 6/1979 | Fed. Rep. of Germany |
| 2903821 | 8/1980 | Fed. Rep. of Germany |
| 3020454 | 12/1980 | Fed. Rep. of Germany |
| 3019423 | 12/1980 | Fed. Rep. of Germany |
| 3035095 | 4/1982 | Fed. Rep. of Germany |

OTHER PUBLICATIONS

K. A. James, W. H. Quick and V. H. Strahan, "Fiber Optics: The Way to True Digital Sensors", *Control Engineering*, Feb. 1979, pp. 30–33.

*Primary Examiner*—Vincent P. McGraw
*Attorney, Agent, or Firm*—Karl F. Milde, Jr.

[57] ABSTRACT

A sensor for measuring a physical parameter at a first location which is remote from a second location. The sensor has a plurality of light transmitting fibers each having an input end for receiving light from a source and an output end for emitting the received light to a light detector and a lens for focusing light from the source on one of the input ends of the light transmitting fibers. The lens is displaced to project light to a specific one of the input ends of the fibers in accordance with the value of the physical parameter to be measured.

4 Claims, 3 Drawing Figures

SENSOR DEVICE FOR MEASURING A PHYSICAL PARAMETER

BACKGROUND OF THE INVENTION

1. Field of the Invention

This invention relates to a novel and improved sensor device for measuring a physical parameter at a first location which is remote from a second location. In particular, this invention relates to a sensor device which incorporates fiber optical signal transmission concepts. Still more particular, this invention relates to a temperature transducer and to a position transducer.

2. Description of the Prior Art

During recent years fiber optical signal transmission has become a significant technological innovation in electronic systems. Among the reasons for preference of fiber optical signal transmissions to the former electric signal transmission is the availability of additional bandwidth combined with the elimination of electromagnetic interferences. Other reasons include the convenient separation of the electric potentials of various system components.

Fiber optical transmission has been used for medium and long distance communication and for digital data transmission in certain industry applications where electromagnetic interference or electric separation is of special significance. Fiber optical transmission lines have also been used in connection with high voltage switching, power plant control and process control of electric furnaces. The application in air craft and in automobiles is discussed.

In control systems, signal communication in digital form is performed not only between data processing units, but also between data processing units and input and/or output devices. Special signal sensitivity exists between sensors and data processing devices. Therefore, fiber optical communication on digital basis has been used for signal transmission between sensors and the control and/or processing system (*Control Engineering*, February, 1979, pages 30-33). The sensor devices serve to acquire input information relative to physical parameters which are of significance for the control and/or processing system, such as temperature, pressure, position, flow, speed, level of liquid, etc.

A sensor device for measuring a physical parameter should combine high accuracy and protection against electromagnetic interference with design simplicity. Such a sensor device should be sturdy and suitable for mass production. In order to keep the costs low, the sensor device should make use of well known and easily obtainable components.

SUMMARY OF THE INVENTION

1. Objects

It is an object of this invention to provide a fiber optical sensor device for measuring a physical parameter at a first location which is remote from a second location where the measurement result is required.

It is another object of this invention to provide a fiber optical sensor device which senses a physical parameter without making use of any electrical device and which transmits a sensed quantity by means of fiber optical transmission lines.

It is still another object of this invention to provide a fiber optical sensor device in which a reading is obtained whenever one or more pre-determined threshold(s) is/are reached.

It is still another object of this invention to provide a temperature transducer.

It is still another object of this invention to provide a position transducer.

2. Summary

According to one aspect of this invention, a fiber optical sensor device for measuring the temperature as a physical parameter contains a light source which emits light towards a first or primary light transmitting fiber or fiber optical cable. The light is received by the light input end of the fiber and transmitted to its light output end. A bimetallic temperature sensing device is associated or arranged with the first light transmitting fiber. This temperature sensing device displaces the light output end of the light transmitting fiber when a temperature change occurs. The fiber optical sensor device further contains a plurality, preferably a multitude or large number, of second or secondary light transmitting fibers. Each of these secondary fibers has a light input end which may receive light from the first transmitting fiber, and a light output end for emitting the received light. The light output ends are arranged in juxtaposition or next to each other such that subsequent ones will receive light from the primary light transmitting fiber when a temperature change occurs and when the bimetallic temperature sensing device changes the relative position of the primary light output end. The sensor device also contains a plurality, preferably a multitude or large number, of light detectors. Each of these light detectors is associated or arranged respectively with one of the secondary light output ends for receiving light from the secondary light transmitting fibers. Depending on the position of the primary light transmitting fiber, one or the other of the secondary light transmitting fibers will receive light therefrom and transmit it to its associated detector.

According to another aspect of this invention, a fiber optical sensor device for measuring a physical parameter contains a light source which emits light towards a first or primary light transmitting fiber or fiber optical cable. The light is received by the light input end of the fiber and transmitted to its light output end. A lens device, such as a single double convex lens or a lens system having a positive focal length, is provided for receiving the light from the primary light output end and for passing the light therethrough. The sensor system also contains a plurality, preferably a multitude, of secondary light transmitting fibers. Each of these secondary fibers has a light input end for receiving light from the lens device, and each has a light output end for emitting the received light. The secondary light output ends are arranged in juxtaposition or next to each other. The sensor device further contains a displacing apparatus for displacing the lens device with respect to the primary light output end. The displacement is responsive to or performed dependent upon the physical parameter to be measured. When a change of the physical parameter occurs, the lens device will project the received light to subsequent ones of the secondary light input ends. The sensor device also contains a plurality, preferably a multitude of light detectors. Each of these detectors is associated or arranged respectively with one of the secondary light output ends. Depending on the position of the lens device, one or the other of the detectors will receive light from the secondary light transmitting fiber.

This invention is based on the following principle: first the physical parameter to be measured is transformed into a motion or shift which i.e. may be linear or circular. The motion or shift of the primary transmitting fiber is utilized to manipulate the characteristics of the light, in the present case of the direction of the light. The direction is sensed by means of one of the secondary light transmitting fibers and its associated light detector.

The foregoing and other objects, features and advantages of the invention will be apparent from the following more particular description of preferred embodiments of the invention, as illustrated in the accompanying drawings.

BRIEF DESCRIPTION OF THE DRAWINGS

For the same or equivalent components and elements, the same reference numerals are used in all FIGS. 1 through 3.

DESCRIPTION OF THE PREFERRED EMBODIMENTS

Figure 1:
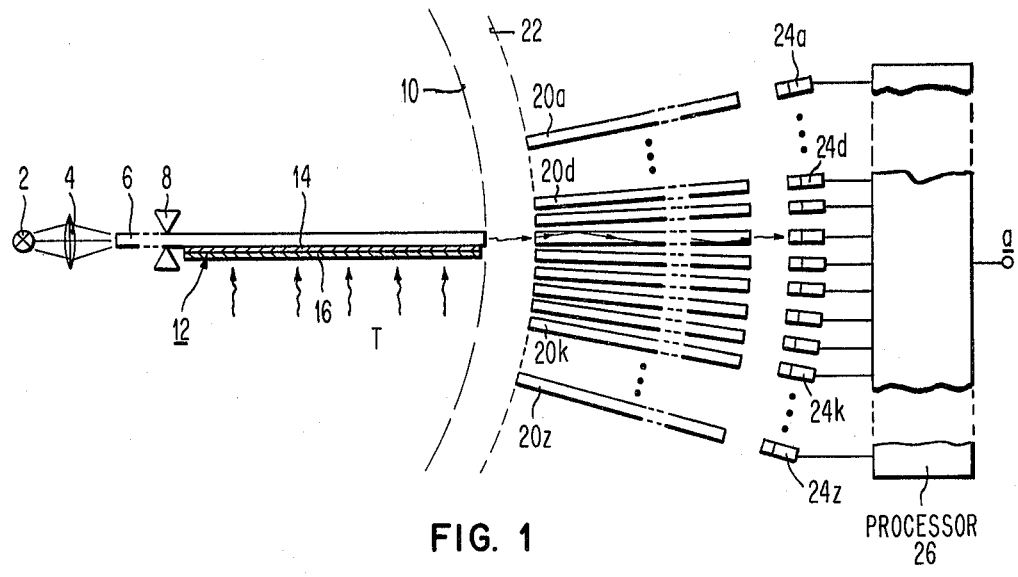
FIG. 1 is an embodiment of a fiber optical sensor device for measuring the temperature, the device containing a temperature sensitive bimetallic strip.

In the schematic representation of FIG. 1, a fiber optical sensor device for measuring the temperature T is provided. The temperature T may be, for instance, the temperature of a gas stream or ambient temperature.

A light source 2 emits a light beam through a focussing system 4, which is represented by a lens, to the input end of a fiber input line or first or primary light transmitting fiber 6. The primary fiber 6 is made of a light conducting material and is flexible at least at its output end portion. The primary fiber 6 may be a single optical fiber. Preferably, however, it is a fiber optical cable containing various glass fibers.

At the output end portion of the primary light transmitting fiber 6, there is provided a bearing 8. The output end of the light transmitting fiber 6 can pivot about the bearing 8 along a circular path 10. In other words, the light output end may be displaced along the path 10. The displacement is in accordance with the temperature T.

The displacement under the effect of the temperature T is achieved by means of a bimetallic temperature sensing and actuating device 12. This device 12 consists of two metallic strips 14 and 16 which are firmly attached to each other. The strips 14 and 16 have temperature coefficients of expansion that are different from each other. The primary optical fiber 6 is fixed onto this strip combination or bimetallic strip, for instance, by an adhesive. Bimetallic temperature sensing and actuating devices 12 are commonly used in temperature sensing and/or temperature control devices and are in themselves well known.

The light source 2 may emit a relatively wide spectrum of light. It may, for instance, exhibit white light which contains all visable spectral components. The light source 2 may be an incandescent lamp or a multitude of LEDs which radiate in the same spectra. The light source 2 may emit infra-red, visible or ultra-violet light.

Close to the light output end of the primary light transmitting fiber 6 are arranged the light input ends of a bundle of receiver fibers or secondary light transmitting fibers $20a, \ldots, 20d, \ldots, 20k, \ldots, 20z$. Their light input ends are arranged next to each other along a circular path 22 in a common plane around the bearing 8. The secondary light transmitting fibers $20a$–$20z$ are provided for transmitting light from the location of the temperature measurement to a remote location where signal processing shall take place. The secondary light transmitting fibers $20a$–$20z$ may be curved.

Associated with the light output end of each secondary light transmitting fiber $20a$–$20z$ is an optical receiver or light detector $24a$–$24z$, respectively. These light detectors $24a$–$24z$ are sensitive to the light from the source 2. Connected to the outputs of the light detectors $24a$–$24z$ is a signal processing device 26. This device 26 may include, for instance, a digital display.

For instance, there may be provided more than 10 secondary light transmitting fibers $20a$–$20z$. Their number depends on the accuracy with which the parameter such as temperature measurement shall be performed.

In an operation of the illustrated fiber optical sensor device, one end portion of the bimetallic strip 12 is curved more or less, according to the temperature T to be measured. In accordance with the curve of the bimetallic strip 12, the output end of the primary fiber 6 (which is attached to the bimetallic strip 12) points in a specific direction. Therefore, the light emitted from the output end of the primary light transmitting fiber 6 will be received by a particular one of the secondary light transmitting fibers $20a$–$20z$, for instance, by the second fiber $20d$. The light is transmitted to its associated light detector $24d$. This detector $24d$ will deliver a strong output signal to the signal processing device 26.

When a temperature change occurs, the bending or curve of the bimetallic strip 12 will change. This results in a change of the orientation of the light output end of the primary light transmitting fiber 6. Thereby, the light from the primary fiber 6 will be received by a different receiver fiber, for instance, by the receiver fiber $20k$. This receiver fiber $20k$ guides the light to the light detector $24k$ which is allocated to the receiver fiber $20k$. Now the light detector $24k$ will deliver a strong output signal to the processing device 26. That is, when a temperature change occurs, the processor 26 will obtain significant output signals subsequently from the light detectors $24d$ to $24k$. Each of these output signals indicates that a certain parameter or temperature threshold has been reached.

The output signals of the detectors $24a$–$24z$ may be transformed by the processor 26 into a corresponding digital output signal a.

Figure 2:
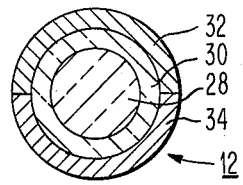
FIG. 2 is an enlarged cross section of a first light transmitting fiber which is coated with two metallic strips forming a bimetallic temperature element.

With reference to FIG. 2, a modification of the sensor device according to FIG. 1 will be explained. As compared to FIG. 1, the right end portion of the first fiber 6 has been changed. FIG. 2 shows the cross section of the modified end portion of the primary fiber 6 on an enlarged scale.

As shown in FIG. 2, the primary light transmitting fiber 6 conventionally contains a glass fiber core 28 which is surrounded by an overcoat 30. The indicies of reflection of the core 28 and the overcoat 30 are different from each other. The fiber 28, 30 is provided with a modified bimetallic temperature sensing device 12.

The bimetallic temperature sensing device 12 contains a first metallic coating 32 which extends along the upper half of the surface of the first light transmitting fiber 28, 30. It also contains a second metallic coating 34 which extends along the lower half of the first light transmitting fiber 28, 30. The first and the second metallic coatings 32 and 34 have temperature coefficients of expansion which are different from each other. As will be noted, both coatings 32 and 34 have approximately the same size. The metallic coatings 32 and 34 may be put on the outer surface of the overcoat 30 in any manner known in the art.

Due to the different temperature coefficients of expansion, the coatings 32 and 34 will bend the first light transmitting fiber 28, 30 in accordance with the sensed temperature T. Similar to FIG. 1, a change in temperature will result in a change of that second light transmitting fiber 20a–20z which is illuminated by the light output end of the first fiber 28, 30. The associated detector 24a–24z will deliver a corresponding output signal.

Figure 3:
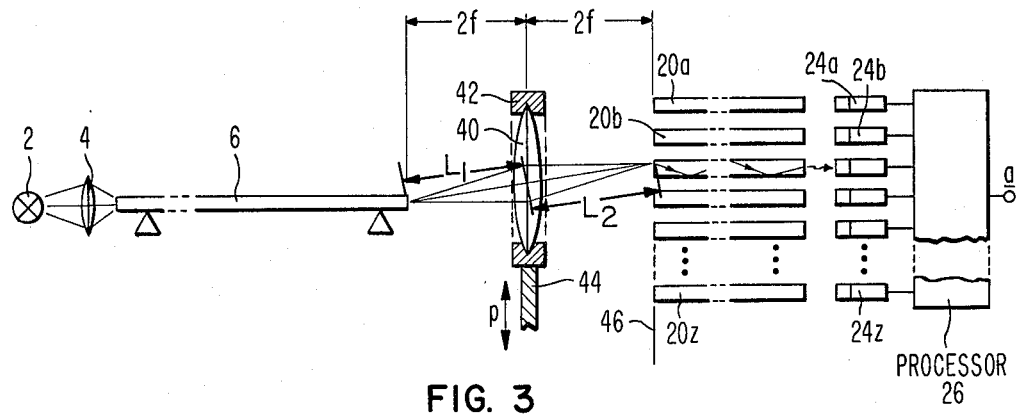
FIG. 3 is another embodiment of a fiber optical sensor device containing a moveable lens for focussing light selectively onto various ones of light transmitting fibers.

In FIG. 3 another embodiment of a fiber optical sensor device for measuring a physical parameter p is illustrated. A light source 2 emits a light beam through a focussing system 4 onto the light input end of a transmitter fiber or primary light transmitting fiber 6. The primary fiber 6 may be omitted if a spot shaped light source 2 is used.

The light from the output end of the primary light transmitting fiber 6 is received by a lens device 40. This lens device 40 may be a simple double convex lens, as illustrated. It is supported by a frame 42. Attached to the frame 42 is a rod 44 which serves to move the lens device 40 linearly under the influence of the physical parameter p. The parameter p to be measured may be, for instance, pressure or temperature. The lens device 40 directs the light received from the transmitting fiber 6 into the light input end of one of various receiving or secondary light transmitting fibers 20a–20z.

The input ends of the secondary light transmitting fibers 20a–20z are arranged next to each other. Only for the sake of clarity, as shown in FIG. 3, there is provided some distance between the individual second fibers 20a–20z. In reality, these fibers 20a–20z should be arranged close together. The input portions are aligned parallel to each other. Their light input ends are arranged along a vertical straight line 46.

Associated with the light output end of each secondary fiber 20a–20z is a light detector 24a–24z, respectively. These detectors may be, for instance, phototransistors or the like.

The focal length f of the lens device 40 is positive. A high sensitivity may be obtained if the distance between the light output end of the fiber 6 and the principal plane of the lens device 40 equals the distance between this principal plane and the input ends of the secondary fibers 20a–20z, and if both distances are twice the focal length f. This requirement meets the condition for 1:1 imaging.

When the lens device 40 is moved linearly under the influence of the physical parameters p, subsequent ones of the input ends of the secondary fibers 20a–20z will be illuminated by the lens device 40. Consequently, subsequent ones of the light detectors 24a–24z will emit an output signal to the processing device 26. The active light detector is an indication of the position of the lens device 40 and therefore of the value of the physical parameter p. The signal transmission occurs free of electromagnetic disturbances.

The arrangement of FIG. 3 makes it possible to increase the sensitivity of the optical fiber sensor by operating the lens in a magnifying mode. In this case, the distance $L_1$ between the light output end of the fiber 6 and the center of the lens 40 must be in the range of 1–2 times f. With the requirement that the light passing through the lens is focused on the input ends of the secondary fibers 20A–20Z, the distance $L_2$ between the center of the lens and these input ends will depend upon the aforementioned distance $L_1$. In any case, however, $L_2$ will be greater than $L_1$ so that small displacements of the lens in the direction of the principal plane thereof due to changes in the parameter p will result in large displacements in the same direction of the point at which the light is focused. The magnifying effect of the lens 40 may thus be used to increase the sensitivity of the sensor device.

While the forms of the sensor device for measuring a physical parameter herein described constitute preferred embodiments of the invention, it is to be understood that the invention is not limited to these precise forms of assembly, and that a variety of changes may be made therein without departing from the scope of the invention.

What is claimed is:

1. A sensor device for measuring a physical parameter, said device comprising in combination:
   (a) a source of light
   (b) a plurality of light-transmitting fibers each having an input end for receiving light and an output end for emitting the light received at said input end and conducted through said fiber;
   (c) a plurality of light detectors, each respectively associated with one of said output ends of said light-transmitting fibers, for receiving light therefrom and indicating the value of said physical parameter;
   (d) lens means for receiving light from said source and for focusing said light on one of said input ends of said light-transmitting fibers;
   (e) means for displacing said lens means with respect to said input ends of said light-transmitting fibers in dependence upon said physical parameter, said lens means projecting said light to a specific one of said input ends of said fibers in accordance with the value of said physical parameter.

2. The sensor device according to claim 1, wherein said lens means is displaceable approximately perpendicularly with respect to the axes of said input ends of said light-transmitting fibers.

3. The sensor device according to claim 2, wherein said axes of said input ends of said secondary light-transmitting fibers are arranged in parallel to each other.

4. The sensor device according the claim 1, wherein said light source includes at least one light-transmitting fiber having an input end and an output end, and means for illuminating said input end, whereby said lens means receives light from said output end.

* * * * *